United States Patent [19]

Palamara

[11] Patent Number: 4,482,263
[45] Date of Patent: Nov. 13, 1984

[54] FOLDABLE TOOTHBRUSH AND TOOTHPASTE SUPPLY UNIT

[76] Inventor: Joseph P. Palamara, 43 Palmer Ave., Tenafly, N.J. 07670

[21] Appl. No.: 494,030

[22] Filed: May 12, 1983

[51] Int. Cl.³ ...................... A46B 11/00; A45D 44/18
[52] U.S. Cl. ...................................... 401/191; 15/185; 132/84 B
[58] Field of Search ............... 401/191, 268, 118, 123, 401/125, 129, 102, 48, 13, 107; 132/84 R, 84 A, 84 B, 84 C, 84 D, 85; 15/167 R, 167 A, 184, 185

[56] References Cited

U.S. PATENT DOCUMENTS

| | | | |
|---|---|---|---|
| 564,739 | 7/1896 | DeLent | 15/185 |
| 611,788 | 10/1898 | Lincoln | 132/84 R |
| 1,033,022 | 7/1912 | Kress | 401/268 |
| 1,142,356 | 6/1915 | Nellany | 132/84 B |
| 1,454,938 | 5/1923 | Miller | 15/185 |
| 1,602,531 | 10/1926 | Itoh | 132/84 R |
| 2,391,651 | 12/1945 | Smith et al. | 401/191 |
| 2,454,995 | 11/1948 | Curran | 15/185 |
| 2,790,449 | 4/1957 | Hennings | 401/268 |
| 3,032,177 | 5/1962 | Majors | 401/123 |
| 4,346,496 | 8/1982 | Murray | 15/185 |

FOREIGN PATENT DOCUMENTS

| | | | |
|---|---|---|---|
| 0602556 | 8/1960 | Canada | 401/123 |
| 0020268 | 12/1980 | France | 15/185 |
| 0576766 | 6/1976 | Switzerland | 132/84 R |
| 0279018 | 2/1927 | United Kingdom | 15/185 |

*Primary Examiner*—Richard J. Apley
*Assistant Examiner*—Carolyn A. Harrison
*Attorney, Agent, or Firm*—Michael Ebert

[57] ABSTRACT

A foldable toothbrush and toothpaste supply unit usable under circumstances where a standard toothbrush and toothpaste dispenser are ordinarily not available, thereby making it possible for the user to brush his teeth, and after one or more times of use, to dispose of the unit. The unit is formed by a single, generally rectangular plate of semi-rigid plastic material having a strip extending from the longitudinal center axis at one end thereof to support a brush. Formed in the other end of the piece and integral therewith is a trough which depends from the piece and is in alignment with the brush, the trough being dimensioned to accommodate the brush and a bed of toothpaste. A transverse score line on the piece creates a living hinge dividing the piece into a brush section and a trough section, such that in the storage mode when the brush section is folded over the trough section, the brush is then nested in the trough and partially immersed in the toothpaste. A pair of longitudinal score lines on the piece which intersect the transverse line create living hinges that define side flaps on either side of the trough, whereby in the operating mode the sections are unfolded and the side flaps are bent down against the sides of the trough to form a substantially bar shaped handle for the brush.

7 Claims, 8 Drawing Figures

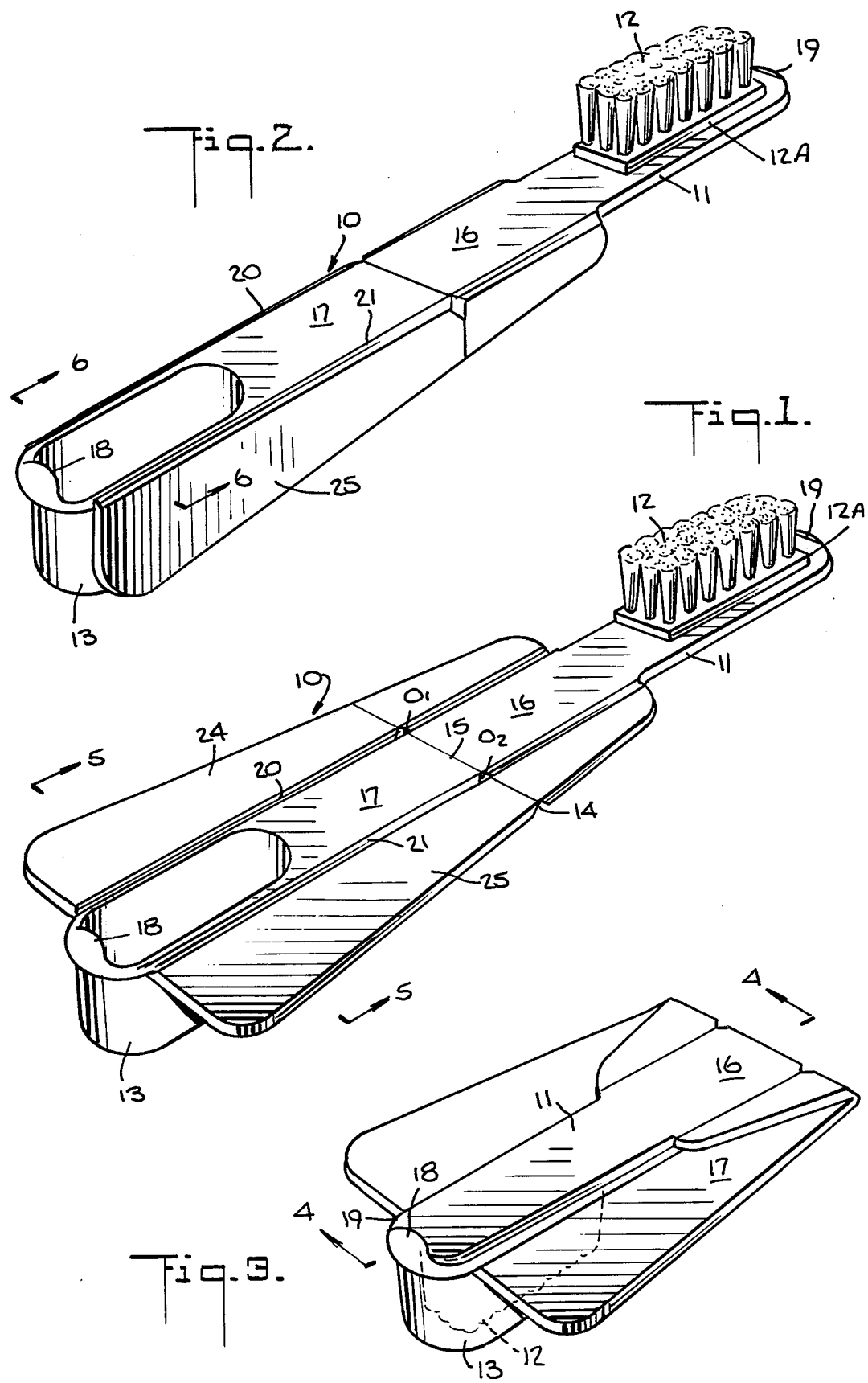

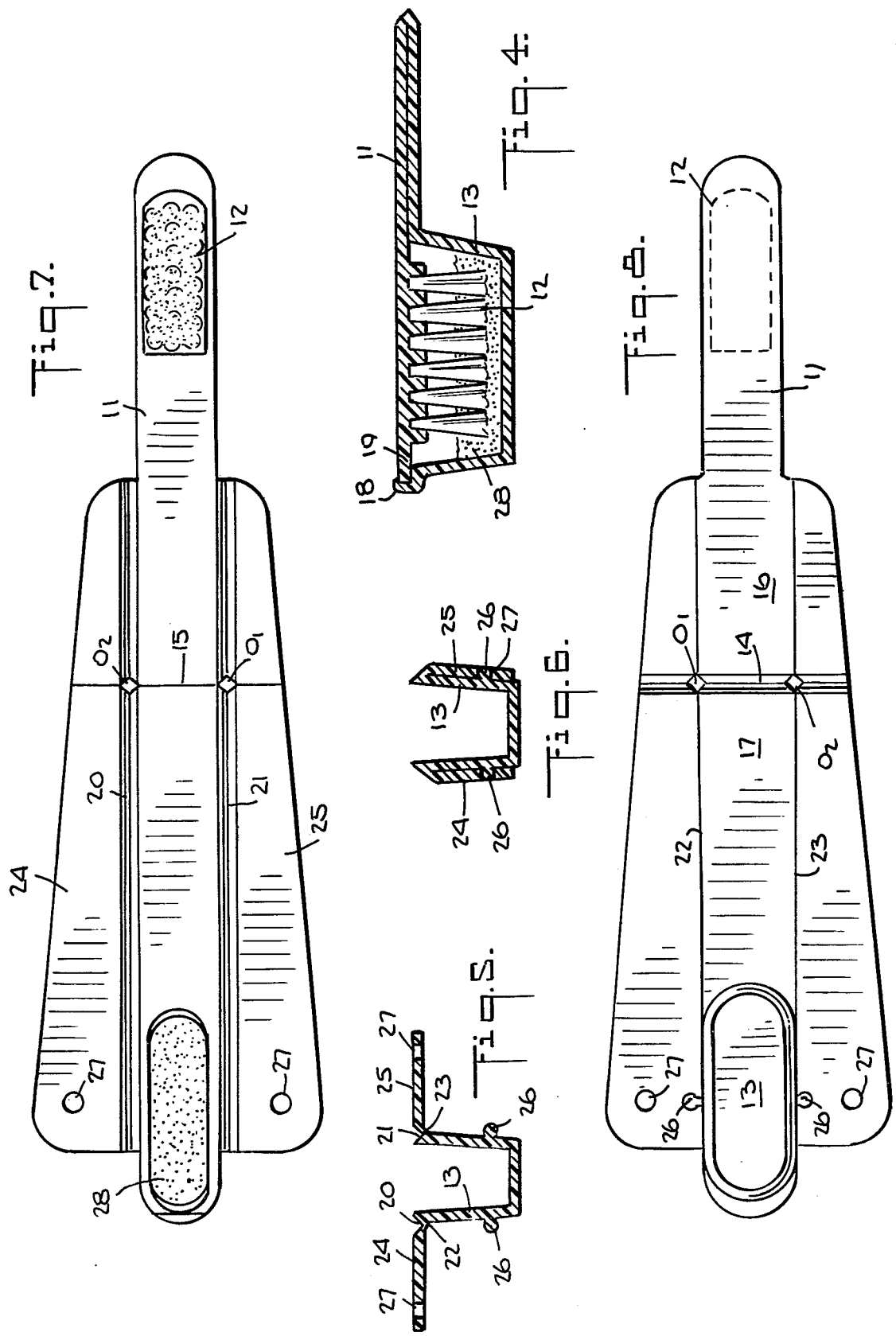

FOLDABLE TOOTHBRUSH AND TOOTHPASTE SUPPLY UNIT

BACKGROUND OF INVENTION

Field of Invention

This invention relates generally to toothbrushes and toothpastes therefor, and more particularly to a foldable and highly compact toothbrush and toothpaste supply unit usable under circumstances where conventional dental hygiene equipment is ordinarily not available.

The most commonplace tool in the field of dental hygiene is the toothbrush which consists of a shank serving as a handle and having a set of bristles attached to one end thereof. The toothbrush is used in conjunction with a dentifrice or paste for cleaning the teeth. By vigorously brushing the teeth at least after every meal one is able to remove debris from the surfaces of the teeth and from the spaces therebetween. Such debris, if permitted to remain, may give rise to dental decay. And by using the brush to massage and stimulate the gum line, one minimizes the possibility of periodontal disease.

A difficulty usually experienced by individuals who wish to practice good dental hygiene is that when away from home, they lack access to a toothbrush and toothpaste dispenser. Thus the typical traveler on a long airplane journey during which meals are served is not in a position to brush his teeth. Nor is a guest at a dinner party or in a restaurant normally able to properly clean his teeth after eating.

One could, of course, upon leaving home, take along a conventional toothbrush and toothpaste tube. But as a practical matter, these items are relatively bulky and cannot be conveniently carried in a coat pocket or elsewhere on the person. This problem has long been recognized by the prior art and many patents have been granted on various forms of portable toothbrushes, some of which incorporate a small supply of dentifrice.

Thus among the patents disclosing collapsible or foldable toothbrushes are the following:
Heilrath, U.S. Pat. No. 766,247;
Goldy, U.S. Pat. No. 1,007,864;
Hill, U.S. Pat. No. 1,266,465;
Hendrickson, U.S. Pat. No. 1,304,769;
Ingle, U.S. Pat. No. 1,537,467;
Smith, U.S. Pat. No. 2,476,686;
Cesari, U.S. Pat. No. 3,741,667;
Sanders, U.S. Pat. No. 3,763,869.

The difficulty with foldable toothbrushes of the type shown in the prior art is that they involve relatively elaborate and costly structures. Also, one must, in addition to the foldable toothbrush, have a supply of toothpaste, and this may not be available in the field. Ideally, a foldable toothbrush should be capable of operating as simply and as efficiently as a standard toothbrush, yet be so inexpensive that it can be discarded even after a single use.

SUMMARY OF INVENTION

In view of the foregoing, the main object of this invention is to provide a highly compact, foldable toothbrush and toothpaste supply unit usable under circumstances where a standard toothbrush and a dentifrice dispenser are ordinarily not available.

More particularly, an object of the invention is to provide a unit of the above type which is molded of a single piece of synthetic plastic materials, with the possible exception of the brush, whereby the unit may be manufactured at very low cost.

A significant advantage of the unit is that is is exceptionally compact and may be stored in a shirt pocket or elsewhere on the person; and because it is inexpensive, it may be discarded even after a single use. In short, the unit is essentially a throw-away item which represents an insignificant investment on the part of the purchaser, and in fact may be given away as a premium or gift for promotional purposes.

Also an object of the invention is to provide a foldable unit of the above type in which the brush in the storage mode is protectively nested in a trough having a bed of toothpaste therein which is penetrated by the bristles of the brush, so that when the brush section of the unit is unfolded, the brush already carries toothpaste, thereby obviating the need to add toothpaste to the brush.

Yet another object of the invention is to provide a unit of the above type which in the storage mode is relatively short and two-dimensional except for the trough; whereas in the operating mode, the unit then has a sizable bar-like handle to facilitate a brushing action.

Briefly stated, these objects are attained in a foldable toothbrush and toothpaste supply unit usable under circumstances where a standard toothbrush and toothpaste dispenser are ordinarily not available, thereby making it possible for the user to brush his teeth, and after one or more times of use, to dispose of the unit. The unit is formed by a single, generally rectangular plate of semi-rigid plastic material having a strip extending from the longitudinal center axis at one end thereof to support a brush. Formed in the other end of the piece and integral therewith is a trough which depends from the piece and is in alignment with the brush, the trough being dimensioned to accommodate the brush and a bed of toothpaste. A transverse score line on the piece creates a living hinge dividing the piece into a brush section and a trough section, such that in the storage mode when the brush section is folded over the trough section, the brush is then nested in the trough and partially immersed in the toothpaste. A pair of longitudinal score lines on the piece which intersect the transverse line create living hinges that define side flaps on either side of the trough, whereby in the operating mode the sections are unfolded and the side flaps are bent down against the sides of the trough to form a substantially bar shaped handle for the brush.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a foldable toothbrush and toothpaste supply unit in accordance with the invention, the unit being shown in its unfolded state;

FIG. 2 shows the same unit with the side flaps folded down to put the unit in its operating mode;

FIG. 3 shows the unit in its storage mode;

FIG. 4 is a section taken through the folded unit in the vertical plane indicated by line 4—4 in FIG. 3;

FIG. 5 is a transverse section taken in the plane indicated by line 5—5 in FIG. 1;

FIG. 6 is a transverse section taken in the plane indicated by lines 6—6 in FIG. 2;

FIG. 7 is a top plan view of the unit; and

FIG. 8 is a bottom plan view of the unit.

DESCRIPTION OF INVENTION

Referring now to FIG. 1, there is shown a unit is accordance with the invention in its unfolded state, the unit being molded or otherwise formed of a single, generally-rectangular plate 10 of semi-rigid synthetic plastic material, such as nylon, polypropylene, polyvinyl chloride or other sterilizable plastic material having acceptable structural properties.

The illustrated form of plate 10 is actually trapezoidal in that the sides are tapered. The term "generally rectangular" as used herein, is intended to cover a four-sided, trapezoidal form as well as a form in which the corner angles are all right angles.

Extending from the short end of piece 10 at the center thereof along the longitudinal axis and integral therewith is a strip 11. Mounted on the upper face at the end of the strip is a brush 12 formed of three rows of bristles anchored in a base 12A which is bonded to the strip 11. In practice, these bristles, instead of being anchored in a base may be included in the molding and therefore be made integral with the strip. Thus the one piece unit including the bristles may be molded of nylon, a material commonly used for toothpaste bristles.

Integral with the other end of piece 10 and depending therefrom is a trough 13 of oblong shape whose position is in line with brush 12, the dimensions of the trough being such that it is capable of accommodating the brush.

Formed on piece 10 on the underface thereof is a transverse score line 14 having a triangular cross section to define a living hinge 15, the score line dividing the piece into a brush section 16 and a trough section 17. This makes it possible, as shown in FIG. 3, to fold brush section 16 over trough section 17, in which condition the brush 12 is protectively nestled within trough 13. A latching nose 18 is formed at the protruding end of trough 13 and acts, when the unit is folded to engage and hold the free end 19 of strip 11 which has an arcuate edge. Because nose 19 is somewhat flexible, one can readily unlatch the unit and unfold it so that is assumes the unfolded form shown in FIG. 1.

Piece 10 is also provided at its upper face with parallel score lines 20 and 21 having a triangular cross section, these lines running longitudinally on either side of trough 13. These score lines create living hinges 22 and 23 (see FIG. 8), which define side flaps 24 and 25. By bending down flaps 24 and 25 against the sides of trough 13, as shown in FIGS. 2 and 6, one then forms a substantially bar shaped handle for the toothbrush. It will be seen in FIG. 7 that the longitudinal score lines which intersect the transverse score line produce small openings $0_1$ and $0_2$ at the points of intersection.

Trough 13, as best seen in FIG. 5, is provided on either side with a detent nipple 36 which, when the flaps 24 and 25 are brought down, engage a correspondingly-positioned socket 27 in the side flaps to hold the flaps in place in the operating mode of the toothbrush.

As shown in FIG. 4, trough 13 contains a small supply of toothpaste 28 which forms a thick bed in the trough. Because the paste is highly viscous, it remains in place regardless of how the unit is oriented. This bed is penetrated by the bristles of brush 12 which are partially immersed therein. Hence when the unit is unfolded, the exposed bristles of the brush then carry a layer of paste and the toothbrush is ready for use, there being no need to add paste thereto.

Because sufficient paste is supplied for more than one use, if, instead of discarding the unit after a single use, one again folds it into its storage mode, the bristles are again re-supplied with paste to permit subsequent use.

In manufacturing the unit, after a charge of paste is added to the trough which acts as a reservoir therefor, it is folded into its storage mode and then packaged in a sealed envelope made of metal foil or plastic material which preserves the sterility of the unit during storage. To put the unit to use, it is removed from the envelope and unfolded in the manner described to render it operative. In its operative mode, the side flaps 24 and 25, which are then at right angles to strip 11, prevent folding of the piece about transverse hinge 15.

While there has been shown and described a preferred embodiment of FOLDABLE TOOTHBRUSH AND TOOTHPASTE SUPPLY UNIT, it will be appreciated that many changes and modifications may be made therein without, however, departing from the essential spirit thereof. Thus while the invention has been described in the context of a brush for cleaning teeth, a similar unit may be designed to function as a brush applicator for a cosmetic cream or for other applicator purposes, in which case the brush formation is appropriate to the use to which it is put, and the trough then acts as a reservoir for the cream to be applied. And because the unit makes use of a flat plastic plate, this plate may be printed or have labels attached thereto carrying a promotional or advertising text. Thus the unit may be distributed by a manufacturer of a particular toothpaste brand which is contained therein to promote the sale of this brand.

Another possible modification providing an even more compact toothbrush is to do away with the trough so that the socalled trough section is now just a handle section. In this arrangement, the brush section is provided at its end with a pair of outstretched wings each having one set of bristles extending laterally therefrom in the same plane as the brush section, so that in the storage mode, the brush section is folded over the handle section and lies flat thereon. When the brush section is folded out in the operating mode and the side flaps are bent down, the two sets of bristles then stand up against each other to create a usable brush.

I claim:

1. A foldable brush and viscous ingredient supply unit comprising:
   A. a generally-rectangular piece of semi-rigid synthetic plastic plate material having a strip extending from the longitudinal center axis at one end thereof;
   B. a brush secured to the upper face of said strip; and
   C. a trough integrated with the other end of the piece and depending therefrom at a position in line with the brush, said trough being dimensioned to accommodate said brush and a bed of the viscous ingredient to be applied thereby;
   D. said piece having a transverse score line at its underface to create a living hinge dividing the piece into a brush section and a trough section foldable thereover to cause the brush to nest in said trough and to be partially immersed in said bed in the storage mode of the unit;
   E. said piece having a pair of parallel longitudinal score lines at its upper face to create living hinges which define side flaps on either side of the trough, whereby in the operating mode in which the sections are unfolded, the flaps may be bent down against the sides of the trough to define a substantially bar shaped handle for the brush.

2. A unit as set forth in claim 1, wherein said brush is a toothbrush having bristles and said ingredient is toothpaste.

3. A unit as set forth in claim 1, wherein said piece has a trapezoidal form and said strip extends from the short end thereof.

4. A unit as set forth in claim 1, wherein said trough is provided with a latching nose which engages the free end of the strip when the sections are folded.

5. A unit as set forth in claim 1, wherein said flaps are provided with detent nipples which engage sockets in the sides of the trough when the flaps are bent down.

6. A unit as set forth in claim 1, wherein said brush has bristles which are integral with said strip.

7. A unit as set forth in claim 6, wherein said piece and said bristles are molded of nylon material.

* * * * *